United States Patent [19]

Paice et al.

[11] 4,011,484
[45] Mar. 8, 1977

[54] UNDERVOLTAGE RELEASE WITH ELECTRICAL RESET FOR CIRCUIT BREAKER

[75] Inventors: Derek A. Paice, Murrysville; Alan B. Shimp, Monroeville, both of Pa.

[73] Assignee: The United States of America as represented by the Secretary of the Interior, Washington, D.C.

[22] Filed: Feb. 23, 1976

[21] Appl. No.: 660,192

[52] U.S. Cl. .................................. 361/59; 361/92
[51] Int. Cl.² ....................... H02H 3/06; H02H 3/24
[58] Field of Search ............ 317/22, 23, 31, 33 SC, 317/DIG. 5; 340/248 B

[56] References Cited
UNITED STATES PATENTS

| | | | |
|---|---|---|---|
| 3,537,757 | 11/1970 | Griffin | 317/31 X |
| 3,657,603 | 4/1972 | Adams | 317/31 X |
| 3,715,742 | 2/1973 | Schweitzer | 317/23 X |

*Primary Examiner*—Harry Moose
*Attorney, Agent, or Firm*—Thomas Zack; Donald R. Fraser

[57] ABSTRACT

An undervoltage circuit having a power supply voltage level detector, a reset circuit, and a hold-in circuit. The level detector of the circuit causes an undervoltage coil to trip a circuit breaker when the power being supplied falls below a predetermined voltage level. When power is restored, an automatic reset circuit resets the circuit breakers undervoltage coil at a preset voltage level by applying a repetitive pulse to the coil. The hold-in circuit applies a continuous current to the same coil of the undervoltage circuit to hold it in once it has been reset.

7 Claims, 2 Drawing Figures

UNDERVOLTAGE RELEASE WITH ELECTRICAL RESET FOR CIRCUIT BREAKER

BACKGROUND OF THE INVENTION

1. Field of the Invention

This invention relates to an improved undervoltage circuit to operate, reset, and hold-in a circuit breaker.

2. Description of the Prior Art

Typically undervoltage trip releases (UVR's) have a movable solenoid or other device which can be energized by the normal voltage supply. When this supply voltage drops below a preset level a spring or other biasing mechanism moves the solenoid's armature to activate a mechanical circuit breaker. To automatically reset the solenoid once power is supplied again it has been common practice to supply a large current pulse from the available source voltage thereby requiring a relatively low impedance source. Where voltage matching transformers are required this low impedance requirement makes the transformers larger than they would otherwise be. Also, remote-control of the large current pulse by external means from areas demanding very high degrees of safety, like coal mines, is complicated.

The U.S. Pat. No. 3,657,603 to William M. Adams discloses an undervoltage disconnect circuit with automatic reset after the supply voltage reaches a predetermined normal operating level. However, it resets the circuit breaker by control means which require a low impedance control source. In our invention in resetting the undervoltage relay coil a repetitive pulse is applied to the UVR coil from a switched voltage doubler circuit. Neither the Adam's invention or any of the other known prior art allows the UVR to be reset and hold in the UVR with the low amount of power we employ.

SUMMARY OF THE INVENTION

The circuitry making up this invention has three main sections namely, a voltage level detector, a hold-in circuit, and an automatic reset circuit. The level detector switches the undervoltage circuit coil off when the supply voltage drops below a preset level. When the supply voltage again rises above the preset level, the reset circuit is activated to pull in the undervoltage coil by continuously sending low power pulses thereto. Once reset the coil is held in by the hold-in circuit supplying a continuous signal thereto.

The primary object of this invention is an improved reset and hold-in circuit for use with an undervoltage disconnect circuit.

Figure 1:
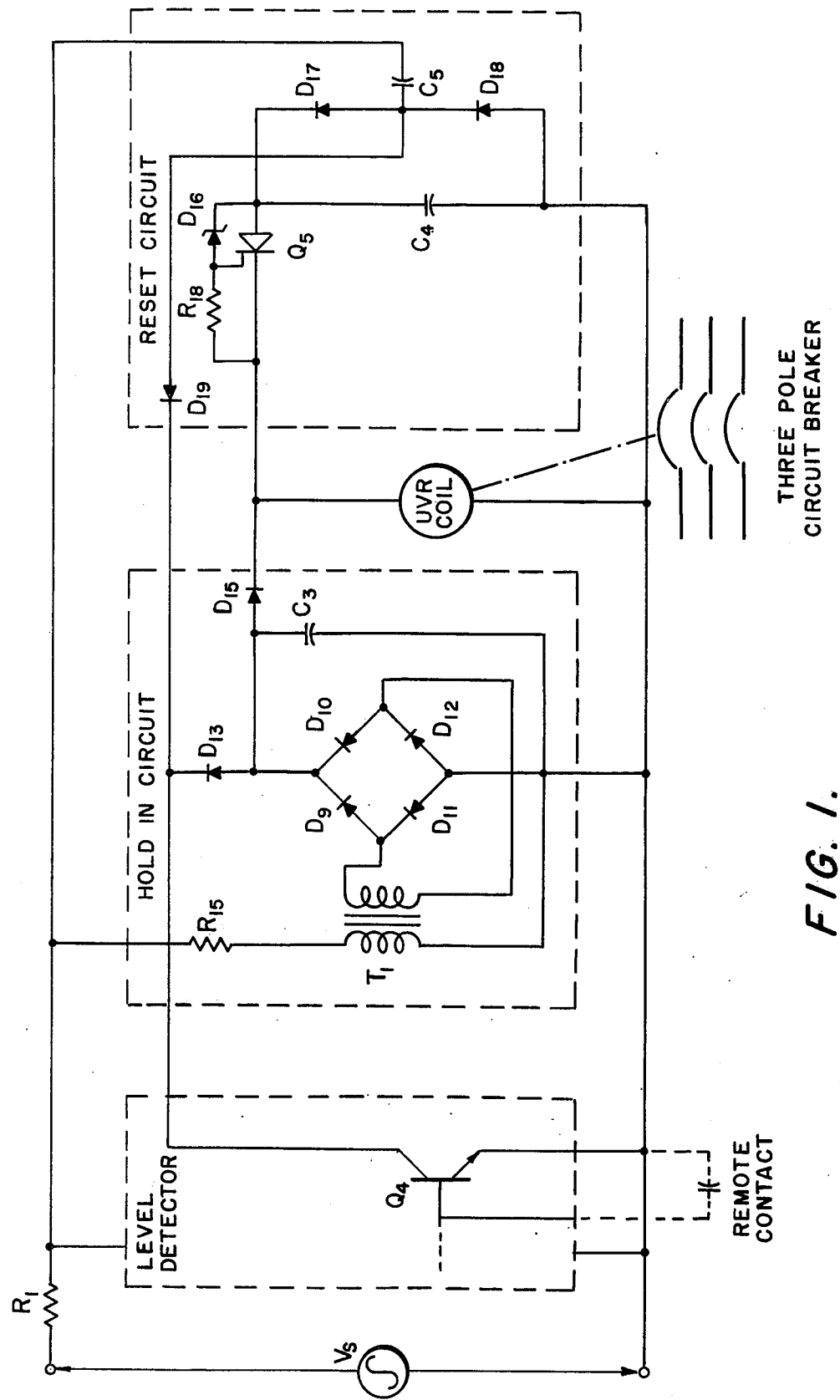
FIG. 1 is a simplified block diagram showing only selected principle components of each of the three functional circuit sections.

The same designations refer to the same common components in each of the two figures. However, as many of the circuit elements —especially in the voltage level detector— are well known, the elements depicted in FIG. 1 are only those considered to be of major importance to the operation of our invention. For purposes of simplification in understanding the basic circuit making up this invention, dotted lines have been placed around the components of the three main functioning sections in both of the figures. In our embodiment, the alternating current (a.c.) supply input voltage Vs would typically be that used in a coal mine to operate machinery from an a.c. load power center. This supply voltage is applied so that it operates the voltage level detector unit having the switching transistor Q4. Thus, when it falls below a specific preset voltage level it trips transistor Q4 to an "on" position. Transistor Q4 is connected in parallel to the undervoltage trip release (UVR) coil as shown. This UVR is conventional in construction and design and has a solenoid coil encircling a movable armature that reciprocates against the action of a biasing spring normally keeping it in an inoperative state when insignificant voltage is impressed on its coil. Such a coil is currently being manufactured as type number 12G07 by the Westinghouse Electric Corporation at its Low Voltage Breaker Division, Beaver, Pennsylvania. Upon transistor Q4 being turned on, the coil is shorted out to give a fail safe condition as regards the operation of the transistor. With no current being supplied to the coil its return spring will operate to disengage the coil's armature and thereby cause the armature to reciprocate and strike the connected trip bar of the external mechanical three pole circuit breaker to cause the breaker to trip. To insure reliability in its operation the detector circuit has a built in hysteresis feature. This feature is the pick up voltage at which the transistor Q4 turns off and is higher than the drop out supply voltage at which the transistor turns back on. Typical values for these two respective voltages are 85 volts (transistor off) and 65 volts (transistor on).

Figure 2:
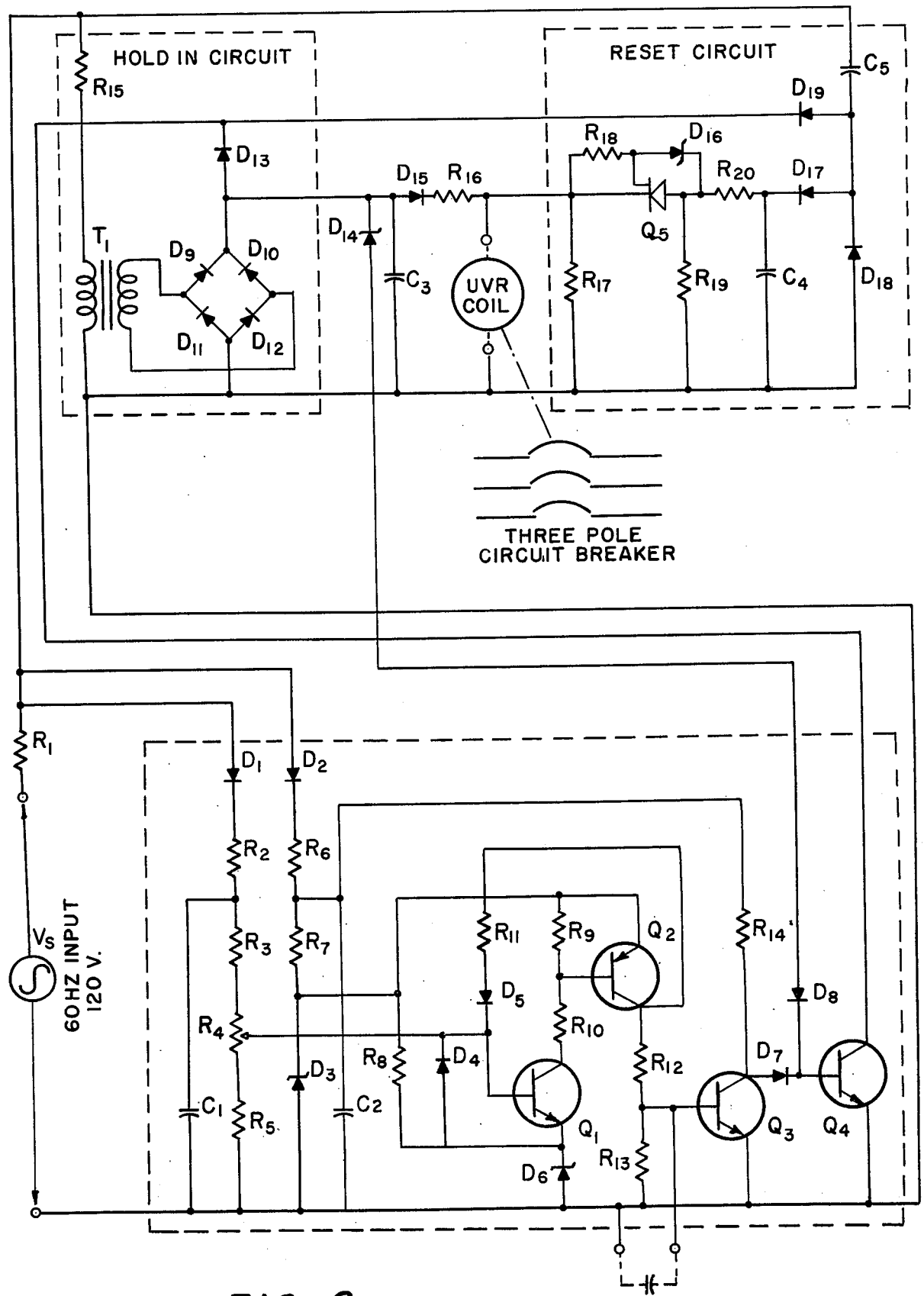
FIG. 2 is a complete circuit diagram of the same preferred embodiment illustrated in block format in FIG. 1.

When used in a potentially dangerous environment, like in a coal mine have dangerous methane laden gas, or in any situation where desired, another method may be used to short the UVR coil and trip the external circuit breaker. This alternate method involves the use of a remote closing contact connected by dotted lines as shown to transistor Q3 (FIG. 2). The breaker may be tripped in this manner regardless of the value of the supply voltage to the undervoltage circuit. In this embodiment the voltage level detector is designed to limit the power in the remote contacts to a very low level (typically 0.25 mW). This very low level of power allows the contacts to be closed in an area containing explosive gases, as in a coal mine, without having to house the contacts in an expensive and bulky explosion proof enclosure.

The reset circuit, shown to the right in both figures, is used to cause the UVR coil to pull in whenever transistor Q4 is turned off. Within this circuit is a voltage doubler consisting of the two capacitors C4 and C5 and the two serially connected diodes D17 and D18. Capacitor C4 is connected in parallel to these two diodes. When operative this doubler causes capacitor C4 to attempt to charge to a voltage level equal to twice the peak value of the a.c. supply voltage Vs. Once the voltage level of capacitor C4 is more than the break over voltage of Zener diode D16 further charging current causes thyristor Q5 to automatically fire. This firing transfers the charge on capacitor C4 into the UVR coil causing it to pull in. Preferably, capacitor C4 is a value such that its stored energy just prior to discharge is more than sufficient to cause the UVR coil to pull in. By selecting different fixed values for Zener diode D16 the triggering voltage level can be varied. As long as the voltage level transistor Q4 is off — indicating the supply voltage level is above a preselected value — capacitor C4 will go through a process of continuously charging and discharging into the coil. The advantage of this repetitive pulsing is that it gives the UVR coil additional chances to pull in or reset itself if for any reason it doesn't pull in on the first discharge. This pulse rate for one working embodiment was typically once every two or three seconds.

Although we prefer to use a voltage doubler circuit to charge capacitor C4 to a level substantially greater than the peak supply voltage (Vs) level, other types of arrangements could also be used. For example, a voltage quadrupler circuit or the like could be used. The reason for selecting a voltage doubler over this would be its greater simplicity and lower cost. In any event, the purpose of this circuit arrangement is to transfer a charge to the capacitor C4 which is preferably at least twenty percent greater than the peak supply voltage level.

To insure that current drawn by the reset circuit is small — less than 10 milliamps — a small value is chosen for the series input capacitor C5 such that it has a high impedance at 60 hertz (Hz). Typically the values for capacitor C5 would be 0.25 $\mu f$ with an impedance of 10,600 ohms. By selecting such values there is minimum power dissipation in the UVR coil and the momentary voltage drop in any matching transformer connected thereto is eliminated. Similarly momentary voltage drops in any resistor connected to the UVR coil are also eliminated as the UVR pulls in.

Besides the stated advantages, this reset circuit arrangement also acts as an effective suppressor for high voltage high frequency transients on the supply voltage. Such transients are common on many types of electrical systems especially those found in coal mines. With the circuit arrangement illustrated at high frequency (above 25 kilohertz) the impedance of the capacitor C4 and the diode combination D17 and D18 is essentially a short circuit compared to the impedance of resistor R1 associated with the detector circuit. Thus any high frequency high voltage transients that occur on the supply voltage would appear mostly across the resistor R1 to inherently protect the undervoltage circuitry.

Depicted between the detector and reset circuitry is a hold-in circuit used to supply a small continuous current to the UVR coil sufficient to hold it in once it has been reset. The value of resistor R15 and the ratio of transformer T1 are chosen to minimize the current drawn from the supply voltage Vs. Typically the value of current drawn is 70 milliamps from a 120 a.c. volt source. Resistor R15 also serves the function of limiting the current through transistor Q4 when it is turned on. The four connected diodes D9, D10, D11, and D12 form a rectifier bridge which rectifies the output from transformer T1 so that the UV coil holding current is d.c. The diodes D13 and D19 form a logic arrangement which insures that both diodes will conduct when transistor Q4 is conducting. Diode 15 serves two functions — prevents the high voltage signal appearing across capacitor C4 from being applied across capacitor C3 and it sets the value of the d.c. current source (in conjunction with transformer T1) for the hold in circuit section. The current from the hold in section is applied either to the UVR coil through diode D15 or the transistor Q4 through diode D13 depending on whether the input voltage Vs is above or below the detected level, respectively.

This invention was primarily designed to be used in a coal mine on an undervoltage unit connected to an alternating current power center. It, of course, can be used in any industrial system where there is an alternating current voltage supply being inputted to an undervoltage unit. It has several advantages namely: it is capable of resetting a standard UVR yet requires only a small current from the power supply to do so; it automatically applies a pulse reset signal to the UVR every few seconds; it is inherently self-protected from power supply transients; it can safely be operated continuously with its output open circuited or short circuited if these conditions should occur. If an external remote contact is used, it need control only a few microjoules tripping energy.

While our invention has been described with respect to a preferred embodiment, these described components and their specific arrangement should not be used to limit or measure the scope and extent of our invention which is to be measured only by the claims which follow.

We claim:

1. An undervoltage reset and hold-in circuit for an alternating current power supply comprising in combination:

circuit detecting means for sensing when the alternating current voltage supply level falls below a preset level;

undervoltage coil circuit means operatively connected to said detector means to trip a circuit breaker when said detecting means is activated by the supply voltage dropping below the preset level;

a reset circuit connected to said coil and supply voltage to reset said undervoltage coil means and its associated circuit breaker by applying a repetitive pulse thereto when above the preset level;

a hold-in circuit operatively connected to said coil and circuits to insure that said coil means is held in an operature condition after being reset by applying a continuous signal thereto.

2. The circuit of claim 1 wherein said detecting means has a triggering device connected in parallel to said coil circuit means.

3. The circuit of claim 2 wherein said coil circuit means comprises a coil encircling a movable armature which is capable of tripping a circuit breaker when activated.

4. The circuit of claim 1 wherein said reset circuit has a voltage multiplier circuit having charge storage means which charges towards a level substantially greater than the peak value of the input voltage.

5. The circuit of claim 4 also including in the reset circuit a solid state triggering device connected to the output of the multiplier circuit, said triggering device having its output operatively associated with the undervoltage coil circuit means to send said repetitive pulse thereto from the multiplier circuit.

6. The circuit of claim 5 wherein triggering device comprises a thyristor connected in parallel with a Zener diode.

7. The circuit of claim 1 wherein said reset circuit comprises a voltage circuit to continuously send said repetitive pulse to the coil, said circuit having two serially connected diodes in parallel to a charging capacitor which is charged to a level substantially greater than the peak supply voltage when the supply voltage level is greater than the preset sensed level.

* * * * *